United States Patent
Cocks et al.

(10) Patent No.: US 11,781,484 B2
(45) Date of Patent: Oct. 10, 2023

(54) SECONDARY FUEL FLOW DEMAND FUEL PUMPING SYSTEM

(71) Applicant: RAYTHEON TECHNOLOGIES CORPORATION, Farmington, CT (US)

(72) Inventors: Peter Cocks, South Glastonbury, CT (US); Michael K. Ikeda, West Hartford, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 17/879,277

(22) Filed: Aug. 2, 2022

(65) Prior Publication Data

US 2022/0381187 A1 Dec. 1, 2022

Related U.S. Application Data

(62) Division of application No. 16/815,737, filed on Mar. 11, 2020, now abandoned.

(60) Provisional application No. 62/821,066, filed on Mar. 20, 2019.

(51) Int. Cl.
| | |
|---|---|
| *F02C 7/236* | (2006.01) |
| *F02C 3/13* | (2006.01) |
| *F02C 7/36* | (2006.01) |
| *F02C 9/26* | (2006.01) |
| *F04D 13/06* | (2006.01) |

(52) U.S. Cl.
CPC ............ *F02C 7/236* (2013.01); *F02C 3/13* (2013.01); *F02C 7/36* (2013.01); *F02C 9/26* (2013.01); *F04D 13/06* (2013.01); *F05D 2220/32* (2013.01); *F05D 2240/35* (2013.01); *F23K 2203/20* (2013.01)

(58) Field of Classification Search
CPC .. F02C 7/22; F02C 7/232; F02C 7/236; F02C 9/26; F02C 9/30; F02C 9/36; F23K 2300/20; F23K 2300/201; F23K 2400/20
See application file for complete search history.

(56) References Cited

U.S. PATENT DOCUMENTS

| | | |
|---|---|---|
| 3,011,308 A | 12/1961 | Wotring |
| 3,841,089 A | 10/1974 | Clark |
| 6,487,847 B1 | 12/2002 | Snow et al. |
| 6,679,048 B1 | 1/2004 | Lee et al. |
| 7,131,274 B2 | 11/2006 | Baryshnikov et al. |
| 8,991,152 B2 | 3/2015 | Heitz |
| 9,091,212 B2 | 7/2015 | Veilleux, Jr. et al. |

(Continued)

FOREIGN PATENT DOCUMENTS

| | | |
|---|---|---|
| GB | 2289722 A | 11/1995 |

OTHER PUBLICATIONS

European Search Report for European Application No. 20163949.9 dated Jul. 22, 2020.

*Primary Examiner* — Scott J Walthour
(74) *Attorney, Agent, or Firm* — Carlson, Gaskey & Olds, P.C.

(57) ABSTRACT

A fuel system for a gas turbine engine includes a main fuel pump generating a main fuel flow into a main fuel passage and a secondary pump generating a secondary fuel flow into a secondary flow passage. A first control valve is disposed in a passage between the main fuel passage and the secondary flow passage. The first control valve selectively directs an excess portion of the main fuel flow to the secondary flow passage to provide at least a portion of the secondary fuel flow.

6 Claims, 4 Drawing Sheets

(56) References Cited

U.S. PATENT DOCUMENTS

| | | |
|---|---|---|
| 2009/0211558 A1 | 8/2009 | Anson et al. |
| 2010/0024434 A1 | 2/2010 | Moore et al. |
| 2011/0289925 A1 | 12/2011 | Dyer et al. |
| 2012/0266600 A1 | 10/2012 | Bader et al. |
| 2013/0036738 A1 | 2/2013 | Pora |
| 2014/0290266 A1 | 10/2014 | Veilleux, Jr. et al. |
| 2016/0167802 A1 | 6/2016 | Lo et al. |

SECONDARY FUEL FLOW DEMAND FUEL PUMPING SYSTEM

CROSS-REFERENCE TO RELATED APPLICATIONS

This application is a divisional of U.S. application Ser. No. 16/815,737 filed on Mar. 11, 2020 which claims priority to U.S. Provisional Application No. 62/821,066 which was filed on Mar. 20, 2019.

BACKGROUND

A gas turbine engine typically includes a fan section, a compressor section, a combustor section and a turbine section. Air entering the compressor section is compressed and delivered into the combustion section where it is mixed with fuel and ignited to generate a high-energy exhaust gas flow. The high-energy exhaust gas flow expands through the turbine section to drive the compressor and the fan section. The compressor section typically includes low and high pressure compressors, and the turbine section includes low and high pressure turbines.

A mechanical pump driven by an accessory gearbox or other rotating shaft of the engine provides fuel flow at a predefined pressure to the combustor. The mechanical pump is reliable and supplies fuel in proportion to engine speed. The minimum capacity of the mechanical pump is sized such that sufficient fuel is provided for high power and low power conditions. Excess fuel not needed is recirculated back to the fuel tank. The energy used on the excess fuel is essentially lost, reducing the overall efficiency of the engine, and reducing the ability to use fuel as a heat sink for thermal management.

Turbine engine manufacturers continuously seek improvements to engine performance including improvements to thermal, transfer and propulsive efficiencies.

SUMMARY

A fuel system for a gas turbine engine according to an exemplary embodiment of this disclosure includes, among other possible things, a main fuel pump generating a main fuel flow into a main fuel passage and a secondary pump generating a secondary fuel flow into a secondary flow passage. A first control valve is disposed in a passage between the main fuel passage and the secondary flow passage. The first control valve selectively directs an excess portion of the main fuel flow to the secondary flow passage to provide at least a portion of the secondary fuel flow.

In a further embodiment of the foregoing fuel system for a gas turbine engine, a boost pump is drawing fuel from a fuel supply and directing fuel flow to the main fuel pump and the secondary pump.

In another embodiment of any of the foregoing fuel systems for a gas turbine engine, an electric motor drives the secondary pump.

In another embodiment of any of the foregoing fuel systems for a gas turbine engine, a second control valve is disposed between the boost pump and the secondary pump. The second control valve selectively reduces fuel flow to the secondary pump in response to communication of excess fuel flow from the main passage to the secondary flow passage.

In another embodiment of any of the foregoing fuel systems for a gas turbine engine, a common shaft drives each of the boost pump, main pump and secondary pump.

In another embodiment of any of the foregoing fuel systems for a gas turbine engine, a selectively actuated clutch is for decoupling the secondary pump from the common shaft.

In another embodiment of any of the foregoing fuel systems for a gas turbine engine, the main pump is disposed between the boost pump and the secondary pump.

In another embodiment of any of the foregoing fuel systems for a gas turbine engine, the secondary pump provides the secondary fuel flow to an ejector pump disposed within a fuel tank.

In another embodiment of any of the foregoing fuel systems for a gas turbine engine, the secondary pump provides the secondary fuel flow to operate an actuator.

In another embodiment of any of the foregoing fuel systems for a gas turbine engine, the main pump comprises a constant volume gear pump.

A gas turbine engine according to an exemplary embodiment of this disclosure includes, among other possible things, a fan rotatable within a fan nacelle, and a core engine that includes a compressor communicating compressed air to a combustor where compressed air is mixed with fuel and ignited to generate a high-energy gas flow expanded through a turbine. An accessory gearbox driven by a mechanical link to the turbine. A fuel system includes a fuel tank with an ejector pump and a main fuel pump drawing fuel from the fuel tank and generating a main fuel flow into a main fuel passage. A secondary pump generates a secondary fuel flow within a secondary flow passage in communication with the ejector pump. A first control valve is disposed in a passage between the main fuel passage and the secondary flow passage. The first control valve selectively directs an excess portion of the main fuel flow to the secondary flow passage to provide the secondary fuel flow.

In a further embodiment of any of the foregoing gas turbine engines, a boost pump draws fuel from the fuel tank and directing fuel flow to the main fuel pump and the secondary pump.

In another embodiment of any of the foregoing gas turbine engines, a second control valve is disposed between the boost pump and the secondary pump. The second control valve selectively shuts off fuel flow to the secondary pump in response to communication of excess fuel flow from the main passage to the secondary flow passage.

In another embodiment of any of the foregoing gas turbine engines, a common shaft drives each of the boost pump, main pump and secondary pump.

In another embodiment of any of the foregoing gas turbine engines, the common shaft is driven by an output of the accessory gearbox.

In another embodiment of any of the foregoing gas turbine engines, a selectively actuated clutch is for decoupling the secondary pump from the common shaft.

In another embodiment of any of the foregoing gas turbine engines, an electric motor is for driving the secondary pump.

A method of supplying fuel to a combustor of a gas turbine engine according to an exemplary embodiment of this disclosure includes, among other possible things, generating a main fuel flow with a main fuel pump and communicating the main fuel flow to a main fuel passage in communication with the combustor, and generating a secondary flow with a secondary pump and communicating the secondary flow to a secondary flow passage. An excess fuel flow bypasses from the main fuel passage into the secondary flow passage to generate at least a portion of the secondary flow.

In a further embodiment of the foregoing method of supplying fuel to a combustor of a gas turbine engine, fuel flow is supplied from a boost pump to the secondary pump and the main fuel pump during a first engine operating condition requiring a first fuel flow. Fuel flow to the secondary fuel pump is stopped during a second engine operating condition requiring a second fuel flow. The second fuel flow includes the excess fuel flow.

In another embodiment of any of the foregoing methods of supplying fuel to a combustor of a gas turbine engine, the secondary fuel pump is deactivated such that the secondary fuel pump stops running in response to excess fuel flow from the main fuel passage, generating a predefined fuel flow that is sufficient to meet secondary fuel flow demands.

Although the different examples have the specific components shown in the illustrations, embodiments of this invention are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figure 1:
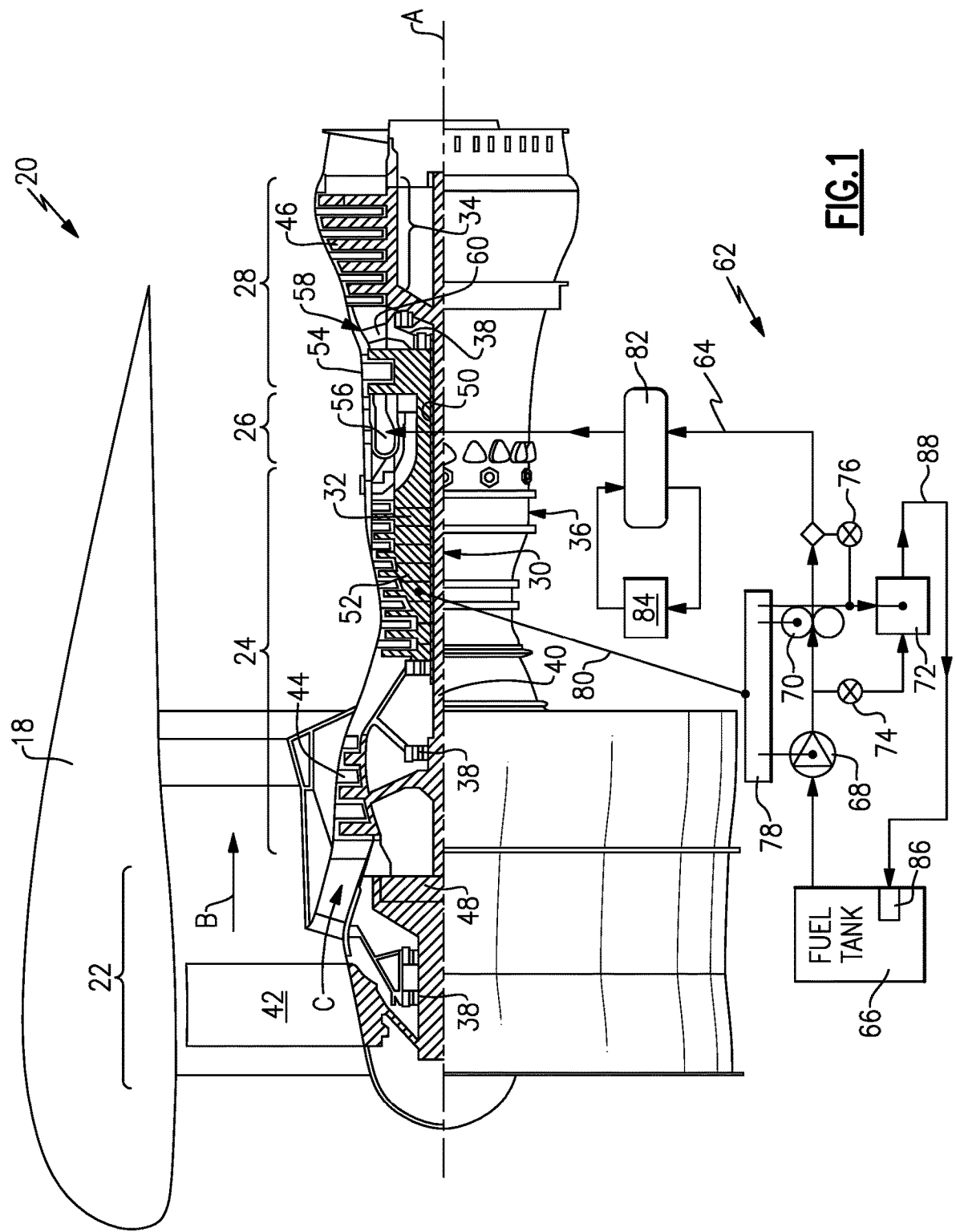
FIG. 1 is a schematic view of an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a nacelle 18, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that the various bearing systems 38 may alternatively or additionally be provided at different locations, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to a fan section 22 through a speed change mechanism, which in exemplary gas turbine engine 20 is illustrated as a geared architecture 48 to drive fan blades 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 58 of the engine static structure 36 may be arranged generally between the high pressure turbine 54 and the low pressure turbine 46. The mid-turbine frame 58 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 58 includes airfoils 60 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor 44 and the fan blades 42 may be positioned forward or aft of the location of the geared architecture 48 or even aft of turbine section 28.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram °R)/(518.7°R)]^{0.5}$. The "Low corrected fan tip speed"

as disclosed herein according to one non-limiting embodiment is less than about 1150 ft/second (350.5 meters/second).

The example gas turbine engine includes the fan section 22 that comprises in one non-limiting embodiment less than about 26 fan blades 42. In another non-limiting embodiment, the fan section 22 includes less than about 20 fan blades 42. Moreover, in one disclosed embodiment the low pressure turbine 46 includes no more than about 6 turbine rotors schematically indicated at 34. In another non-limiting example embodiment, the low pressure turbine 46 includes about 3 turbine rotors. A ratio between the number of fan blades 42 and the number of low pressure turbine rotors is between about 3.3 and about 8.6. The example low pressure turbine 46 provides the driving power to rotate the fan section 22 and therefore the relationship between the number of turbine rotors 34 in the low pressure turbine 46 and the number of blades 42 in the fan section 22 disclose an example gas turbine engine 20 with increased power transfer efficiency.

Fuel is delivered to the combustor 56 by a fuel system 62. The example fuel system 62 includes a boost pump 68 that draws fuel from a fuel tank 66. The boost pump 68 communicates fuel at a low pressure to a main pump 70. The main pump 70 increases the pressure of a fuel flow 64 and communicates that fuel to the combustor 56. A heat exchanger 82 may be included to use the fuel flow 64 as a heat sink to cool flows from other engine systems schematically indicated at 84. The engine system 84 may be any system that generates heat such as for example a lubricant system. Lubricant from the lubricant system is cooled by fuel flow 64 that is then communicated to the combustor 56.

The main pump 70 and boost pump 68 are mechanically driven by a connection to one of the inner and outer shafts 40, 50. In this example, an accessory gearbox 78 is driven through a tower shaft 80 by the outer shaft 50. The accessory gearbox 78 includes outputs that drive the boost pump 68 and the main pump 70. It should be appreciated, that other drive connections could be utilized and are within the contemplation and scope of this disclosure.

The example fuel system 62 further includes a secondary pump 72 that may also be driven by the accessory gearbox 78. The secondary pump 72 generates a secondary fuel flow 88 that is utilized as motive flow to drive an ejector pump 86 within the fuel tank 66. The ejector pump 86 provides for movement of fuel within the fuel tank 66 to prevent starvation of fuel to the boost pump 68. The secondary flow 88 may also be utilized for other devices that utilize fuel flow for actuation.

The main pump 70 is sized to provide flow for high power (such as take-off and climb) and low power (such as start) engine operating conditions. However, most engine operating time is conducted at intermediate power conditions such as cruise or decent. Accordingly, during the intermediate power conditions, some portion of fuel flow that is not needed is recirculated to a location upstream from the main pump 70 or back to the fuel tank 66. Work that is performed to increase the fuel flow pressure is wasted with regard to the recirculated fuel flow and this work also increases the recirculated fuel flow temperature. The recirculated fuel flow is also hotter than fuel from the fuel tank 66 and may reduce the available heat acceptance capacity.

The disclosed example fuel system 62 utilizes the excess fuel flow to provide at least a portion, if not all of the secondary flow. Once the engine begins operation at a lower power level where a portion of the fuel flow 64 is not needed, control valves 74 and 76 will be actuated to stop flow to the secondary pump 72 and communicate excess flow to provide the desired secondary flow 88. Utilizing the excess flow to provide at least a portion of the secondary flow 88 reduces engine work extraction and reduces the generation of waste heat thereby improving the heat acceptance capability of the fuel while also increasing overall engine operating efficiency.

Figure 2:
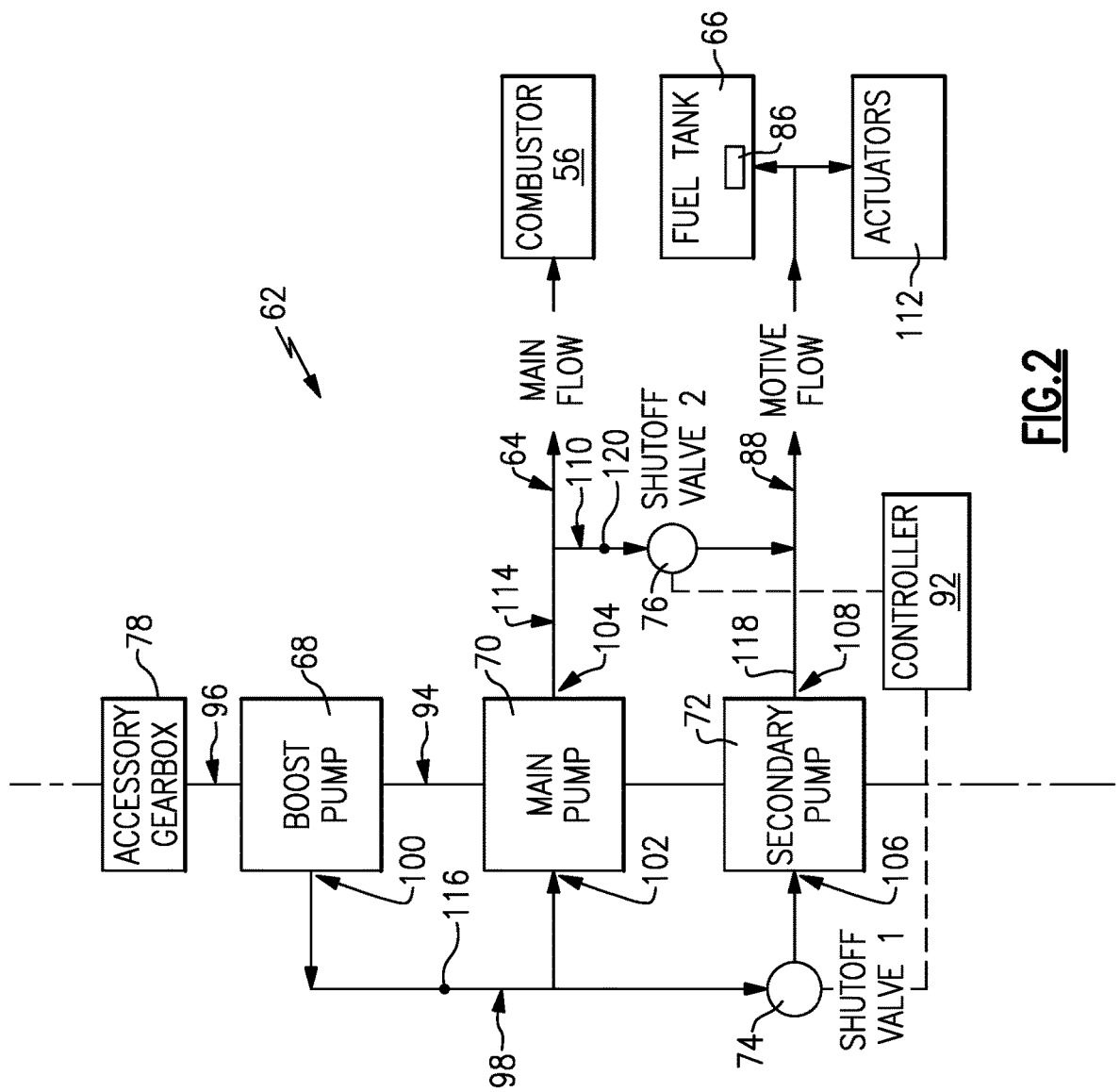
FIG. 2 is a schematic view of an example fuel system embodiment.

Referring to FIG. 2 with continued reference to FIG. 1, the example fuel system 62 is schematically shown and includes the boost pump 68, main pump 70 and secondary pump 72 all driven by a common shaft 94. In one disclosed example, the shaft 94 is an output of the accessory gearbox 78 that rotates about a common axis 96. Each of the boost pump 68, main pump 70 and the secondary pump 72 are constant volume mechanical gear pumps of a known configuration.

The main fuel pump 70 includes an inlet 102 and an outlet 104 and generates the main fuel flow 64 into a main fuel passage 114. The secondary pump 72 includes an inlet 106 and an outlet 108 and generates the secondary fuel flow 88 within a secondary flow passage 118. A control valve 76 is disposed in a bypass passage 120 between the main fuel passage 114 and the secondary flow passage 118. The control valve 76 selectively directs an excess fuel flow 110 of the main fuel flow 64 to the secondary flow passage 118 to provide at least a portion of the secondary fuel flow 88. A controller 92 is in communication with the control valves 74, 76 to govern operation and direct fuel flow according to engine operating conditions.

The boost pump 68 draws fuel from the fuel tank 66 and directs boost fuel flow 98 through an outlet 100 into a boost passage 116. The boost passage 116 is in communication with the inlet 102 of the main pump 70 and the inlet 106 of the secondary pump 72. The control valve 74 is disposed between the boost pump 68 and the secondary pump 72 to control flow to the secondary pump 72. The control valve 74 selectively shuts off fuel flow 98 to the secondary pump 72 in response to communication of excess fuel flow from the main passage 114 to the secondary flow passage 118. The secondary pump 72 is thereby starved of fuel and runs dry while the excess fuel flow from the main pump 70 is used to generate the secondary flow 88.

The secondary flow 88 is supplied as motive flow to the ejector pump 86 disposed within the fuel tank 66. The ejector pump 86 provides for balancing the amount of fuel within the fuel tank 66 as well as maintaining sufficient fuel at an outlet to the boost pump 68. The example ejector pump 86 is disclosed as an example of how the secondary flow 88 is utilized. It should be appreciated that other uses for the secondary fuel flow 88 are within the contemplation of this disclosure. For example, the secondary fuel flow 88 may be communicated to actuators 112 that use the pressurized fuel flow for operation.

During initial engine operation at higher power levels, all the fuel from the main pump 70 is utilized by the combustor 56 to generate engine power. At the higher power levels, the control valve 76 is off to prevent flow through the bypass passage 120. The control valve 74 is open to communicate fuel flow 98 to the secondary pump 72. The secondary pump 72 generates the secondary flow 88 within the secondary passage 118. The secondary flow 88 is communicated to the ejector pump 86 and/or the actuators 112. Other control valves or systems may be included to operate the actuators 112 and ejector pump 86.

At the intermediate power operating conditions where excess main pump flow exists, the control valve 76 will open to direct excess fuel flow 110 through the bypass passage 120 to the secondary flow passage 118. The control valve 76 may be an on/off valve or a proportional valve to tailor the flow of fuel from the main passage 114 to engine fuel demand. The shutoff valve 74 is concurrently operated to reduce and/or stop flow to the secondary pump 72. The shutoff valve 74 may also be an on/off valve or a proportional valve. As the excess fuel flow 110 from the main pump 70 increases, the amount of flow needed from the secondary pump 72 will decrease and eventually stop. Accordingly, excess fuel flow from the main pump 70 will take over the generation of the secondary flow 88 and the secondary pump 72 will run dry.

Upon a subsequent increase in fuel demand, the control valves 74, 76 will operate to again communicate flow to the secondary pump 72 and stop flow through the bypass passage 120.

Figure 3:
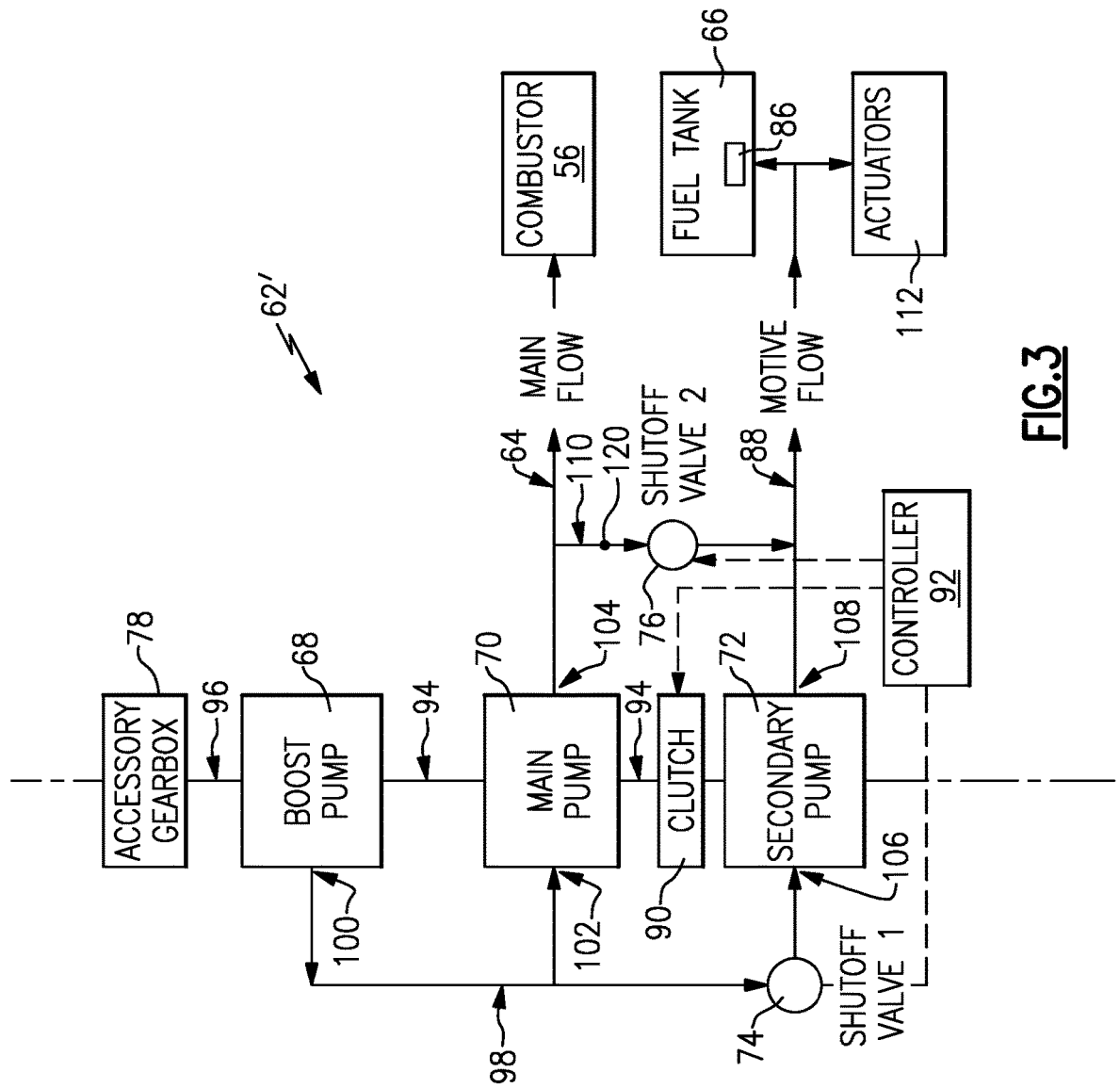
FIG. 3 is a schematic view of another example fuel system embodiment.

Referring to FIG. 3, with continued reference to FIG. 1, another example fuel system embodiment is shown schematically and indicated at 62'. The example fuel system 62' includes a clutch 90 that is operable by the controller 92. The operation of the fuel system 62' is as disclosed above with the addition of shutting down the secondary pump 72 when not receiving fuel flow. The clutch 90 enables the secondary pump 72 to be shut down to reduce energy use and prevent dry running when the main pump 70 is generating sufficient excess fuel flow to provide the secondary flow 88.

Figure 4:
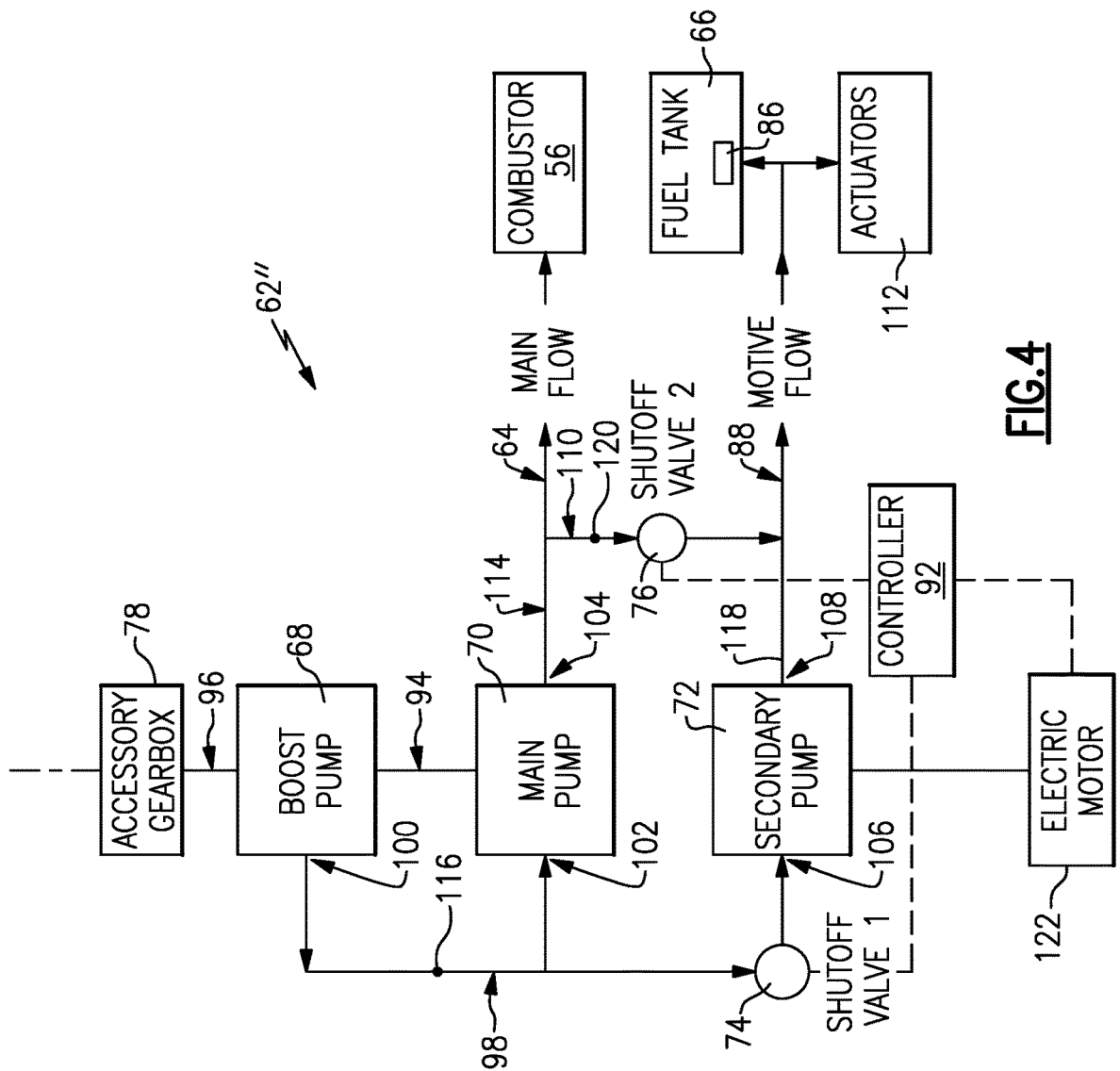
FIG. 4 is a schematic view of yet another example fuel system embodiment.

Referring to FIG. 4, with continued reference to FIG. 1, another example fuel system 62". The example fuel system 62" includes an electric motor 122 that is operable by the controller 92. The operation of the fuel system 62" is as disclosed above with the addition of shutting down the secondary pump 72 through control of the electric motor 122 when not receiving fuel flow. The electric motor 122 enables the secondary pump 72 to be shut down to reduce energy use and prevent dry running when the main pump 70 is generating sufficient excess fuel flow to provide the secondary flow 88. Moreover, the electric motor 122 enables diving the pump 72 at a variable speed to match the secondary flows needed for motive flow and to power the actuators 112.

Accordingly, the disclosed fuel systems utilize excess fuel flow to generate the required secondary flow to reduce excess heat within the fuel and increase engine efficiency.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A fuel system for a gas turbine engine comprising:
a fuel tank configured to store a liquid fuel;
a main fuel pump configured to generate a main fuel flow into a main fuel passage;
a secondary pump configured to generate a secondary fuel flow into a secondary flow passage, wherein the secondary pump is operable separate from the main fuel pump and shut off in response to the main fuel flow being sufficient to provide the secondary fuel flow;
a boost pump configured to draw fuel from the fuel tank and direct fuel flow to the main fuel pump and the secondary pump;
a first control valve disposed in a passage between the main fuel passage and the secondary flow passage, wherein the first control valve selectively directs an excess portion of the main fuel flow to the secondary flow passage to provide at least a portion of the secondary fuel flow;
a second control valve disposed between the boost pump and the secondary pump, the second control valve configured to selectively reduce fuel flow to the secondary pump in response to communication of excess fuel flow from the main passage to the secondary flow passage;
the boost pump and main pump mounted on a common shaft, the common shaft configured to drive each of the boost pump, the main pump, and the secondary pump; and
a selectively actuated clutch configured to selectively couple and decouple the secondary pump and the common shaft.

2. The fuel system as recited in claim 1, wherein the main pump is disposed between the boost pump and the secondary pump.

3. The fuel system as recited in claim 1, wherein the secondary pump provides the secondary fuel flow to an ejector pump disposed within the fuel tank.

4. The fuel system as recited in claim 1, wherein the secondary pump provides the secondary fuel flow to operate an actuator.

5. The fuel system as recited in claim 1, wherein the main pump comprises a constant volume gear pump.

6. A gas turbine engine comprising:
a fan rotatable within a fan nacelle;
a core engine including a compressor configured to communicate compressed air to a combustor where compressed air is mixed with fuel and ignited to generate a high-energy gas flow expanded through a turbine;
an accessory gearbox driven by a mechanical link to the turbine; and
a fuel system including:
a fuel tank including an ejector pump;
a main fuel pump configured to draw fuel from the fuel tank and to generate a main fuel flow into a main fuel passage;
a secondary pump configured to generate a secondary fuel flow within a secondary flow passage in communication with the ejector pump, wherein the secondary fuel pump is operable independent of the main fuel pump such that the secondary fuel pump is off when the main fuel pump outputs sufficient fuel flow to provide each of the main fuel flow and the secondary fuel flow;
a boost pump configured to draw fuel from the fuel tank and to direct fuel flow to the main fuel pump and the secondary pump;
a common shaft disposed within the accessory gearbox about an axis and configured to drive each of the boost pump, main fuel pump and secondary pump, wherein the main fuel pump and the secondary fuel pump are mounted on the common shaft;
a selectively actuated clutch configured to selectively couple and decouple the secondary pump and the common shaft;
a first control valve disposed in a passage between the main fuel passage and the secondary flow passage, wherein the first control valve selectively directs an excess portion of the main fuel flow to the secondary flow passage to provide the secondary fuel flow; and
a second control valve disposed between the boost pump and the secondary pump, the second control valve configured to selectively reduce fuel flow to the secondary pump in response to communication of excess fuel flow from the main passage to the secondary flow passage.

\* \* \* \* \*